(12) United States Patent
Young (10) Patent No.: US 7,938,593 B1
(45) Date of Patent: May 10, 2011

(54) SPLIT TUBE CONNECTOR SYSTEM

(75) Inventor: Roland O. Young, Grand Forks, ND (US)

(73) Assignee: Telpro, Inc., Grand Forks, ND (US)

( * ) Notice: Subject to any disclaimer, the term of this patent is extended or adjusted under 35 U.S.C. 154(b) by 139 days.

(21) Appl. No.: 12/483,321

(22) Filed: Jun. 12, 2009

(51) Int. Cl.
*F16B 7/04* (2006.01)
(52) U.S. Cl. .................................. 403/297; 403/379.3
(58) Field of Classification Search .............. 285/397; 403/297, 306, 314, 379.3
See application file for complete search history.

(56) References Cited

U.S. PATENT DOCUMENTS

| | | | | | |
|---|---|---|---|---|---|
| 1,960,405 | A | * | 5/1934 | Amor | 403/292 |
| 2,290,430 | A | * | 7/1942 | Heiser | 403/297 |
| 2,850,304 | A | * | 9/1958 | Wagner | 285/397 |
| 2,952,484 | A | * | 9/1960 | Zoltok | 403/297 |
| 3,088,178 | A | * | 5/1963 | Propst | 403/297 |
| 3,484,830 | A | * | 12/1969 | Wagner et al. | 285/397 |
| 3,547,475 | A | * | 12/1970 | Gingher | 403/297 |
| 3,606,408 | A | * | 9/1971 | Wagner | 403/297 |
| 3,620,558 | A | * | 11/1971 | MacMillan et al. | 403/290 |
| 4,440,518 | A | * | 4/1984 | Davlantes | 403/297 |
| 4,859,109 | A | * | 8/1989 | Targetti | 403/297 |
| 5,605,410 | A | * | 2/1997 | Pantev | 403/297 |
| 5,642,957 | A | * | 7/1997 | Lange | 403/297 |
| 5,893,675 | A | * | 4/1999 | Lange | 403/297 |
| 2005/0008431 | A1 | * | 1/2005 | Albaugh | 403/297 |

* cited by examiner

*Primary Examiner* — Joshua T Kennedy
(74) *Attorney, Agent, or Firm* — Neustel Law Offices (57) ABSTRACT

A split tube connector for efficiently connecting separate tubular members together. The split tube connector generally includes a first tubular member, a second tubular member separate from the first tubular member and a connector assembly including a first connector and a second connector connected to the first connector, wherein a first end of the connector assembly is removably positioned within the first tubular member and wherein a second end of the connector assembly is removably positioned with the second tubular member. The first connector and the second connector laterally adjust to engage a first inner surface of the first tubular member and a second inner surface of the second tubular member to frictionally connect the first tubular member to the second tubular member via the connector assembly.

16 Claims, 8 Drawing Sheets

SPLIT TUBE CONNECTOR SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a tube connector and more specifically it relates to a split tube connector system for efficiently connecting separate tubular members together.

2. Description of the Related Art

Any discussion of the related art throughout the specification should in no way be considered as an admission that such related art is widely known or forms part of common general knowledge in the field.

Tubular members including masts, posts, rails, etc. have often been difficult and awkward to transport, store, and erect because of their length. Various attempts have been made to try and overcome this problem by separating the elongated tubular members into several components and then erecting them at site. However, the fastening systems used to secure the multiple components together to form a single elongated tubular member have often themselves been difficult or awkward to handle thus minimizing the potential benefit gained. Because of the inherent problems with the related art, there is a need for a new and improved split tube connector for efficiently connecting separate tubular members together.

BRIEF SUMMARY OF THE INVENTION

A system for efficiently connecting separate tubular members together. The invention generally relates to a tube connector which includes a first tubular member, a second tubular member separate from the first tubular member and a connector assembly including a first connector and a second connector connected to the first connector, wherein a first end of the connector assembly is removably positioned within the first tubular member and wherein a second end of the connector assembly is removably positioned with the second tubular member. The first connector and the second connector laterally adjust to engage a first inner surface of the first tubular member and a second inner surface of the second tubular member to frictionally connect the first tubular member to the second tubular member via the connector assembly.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 8 illustrate a split tube connector 10, which comprises a first tubular member 30, a second tubular member 40 separate from the first tubular member 30 and a connector assembly 50 including a first connector 60 and a second connector 80 connected to the first connector 60, wherein a first end 51 of the connector assembly 50 is removably positioned within the first tubular member 30 and wherein a second end 52 of the connector assembly 50 is removably positioned with the second tubular member 40. The first connector 60 and the second connector 80 laterally adjust to engage a first inner surface of the first tubular member 30 and a second inner surface of the second tubular member 40 to frictionally connect the first tubular member 30 to the second tubular member 40 via the connector assembly 50.

B. Cabinet Lifter

Figure 1:
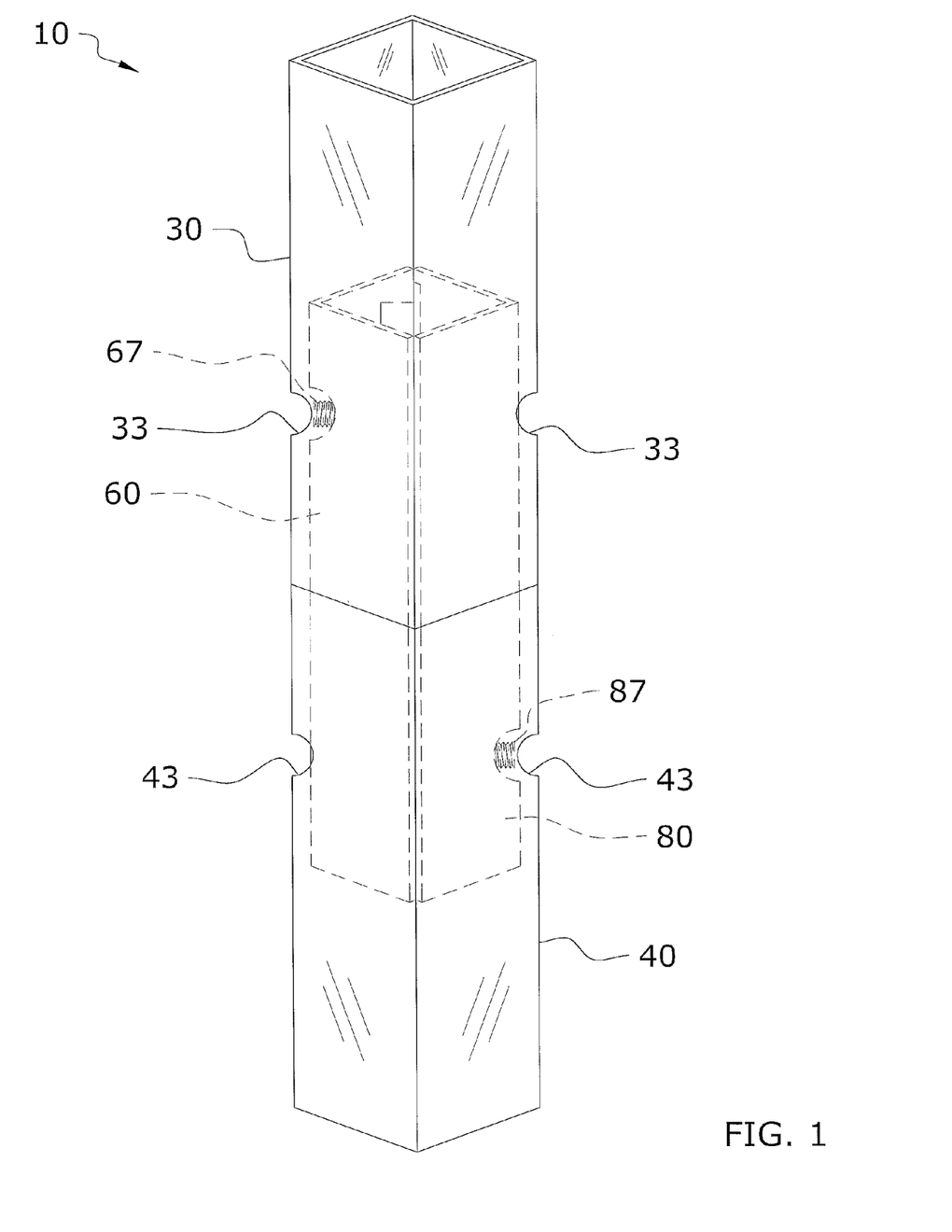
FIG. 1 is an upper perspective view of the connector assembly holding the tubular members together.
Figure 2:
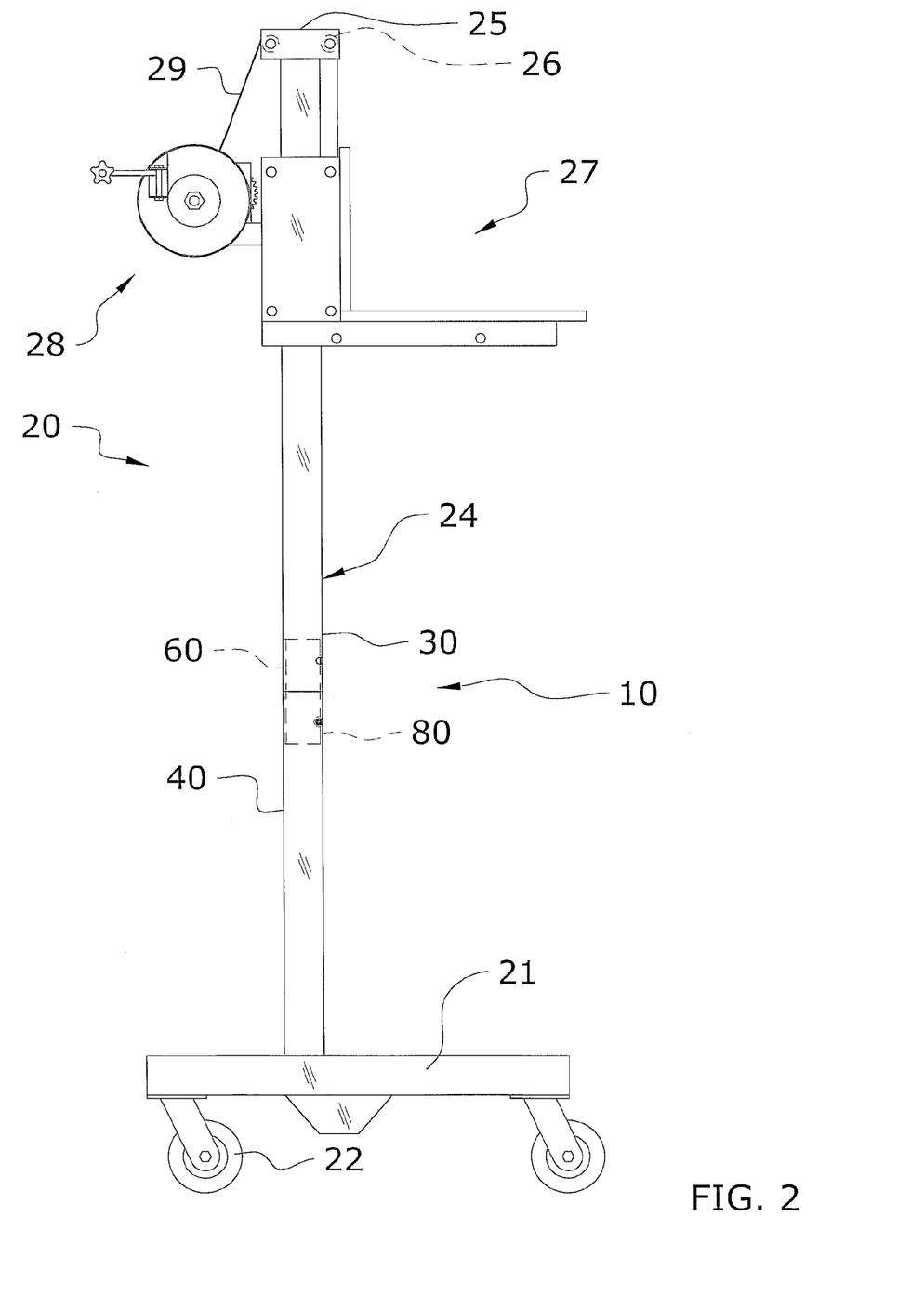
FIG. 2 is a side view of the present invention being used with a vertical mast of a cabinet lift.

FIG. 2 illustrates an exemplary a cabinet lifter 20. The cabinet lifter 20 is capable of lifting and lowering a load such as but not limited to a cabinet (e.g. plasterboard, drywall panel, paneling, wooden panels, composite panels, bricks and the like).

The cabinet lifter 20 includes a plurality of legs 21 with wheels 22, a base connecting the legs 21, at least one vertical mast 24 extending upwardly from the base and an upper support 25. A lifting unit 27 and a drive unit 28 (e.g. winch, etc.) vertically move along the vertical mast 24 via an elongated member 29 extending from the drive unit 28, around the upper support 25, and back to the lifting unit 27. Pulleys 26 may be rotatably connected to the upper support 25 for receiving the elongated member 29.

C. Tubular Members

The split tube connector 10 is used to secure a pair of tubular members 30, 40 to each other in a manner that substantially conceals any connector 50 so that the tubular members 30, 40 appear to be one piece. In a cabinet lifter 20 embodiment the tubular members 30, 40 comprise the vertical mast 24, wherein the vertical mast 24 is comprised of the first tubular member 30 and the second tubular member 40 to allow for the vertical mast 24 to be rapidly broken down into smaller parts for compact transportation and shipping and subsequently allow for a secure reconnection of the vertical mast 24. The present invention may further allow for height adjustability of the vertical mast 24.

It is appreciated however that the present invention may be used for a wide variety of tubular members in various other applications, all of which include a first tubular member 30 and a separate second tubular member 40 that are desired to be connected in a stable, virtually seamless, non-permanent, and quick manner. Further, the present invention may be used to connect tubular members oriented in vertical, horizontal, angled or various other manners. The present invention may further be used to connect similar circumference and length tubular members or varying circumference and/or length tubular members, wherein the connector assembly 50 would be sized to accommodate the differing tubular members.

The tubular members 30, 40 preferably each are comprised of a square cross-sectional shape and may be comprised of varying lengths. The tubular members 30, 40 are generally hollow and each include an open end 31, 41 for receiving opposite ends of the connector assembly 50 within a respective tubular member 30, 40. The connector assembly 50 laterally adjusts tightly against an inside surface of each of the tubular members 30, 40 to prevent the tubular members 30, 40 from moving because of a friction force between the connector assembly 50 and the tubular members 30, 40. An opening 33, 43 also extends through each of the tubular members 30, 40, preferably along a longitudinal corner for adjustment of a fastener 67, 87 within. It is appreciated that each of the tubular members 30, 40 may include a pair of openings 33, 43, wherein each of the first openings 33 align and each of the second openings 43 align and wherein the first openings 33 extend through opposing longitudinal corners of the first tubular member 30 and the second openings 43 extend through opposing longitudinal corners of the second tubular member 40. The multiple openings 33, 43 allow for the connector assembly 50 to be positioned in opposite orientations to more quickly utilize the present invention. It is appreciated that only one of the first openings 33 and one of the second openings 43 are utilized at a time.

Further, each of the tubular members 30, 40 include an inner support 35, 45 extending diagonally across the inside of the tubular member 30, 40. The inner supports 35, 45 prevent the connector assembly 50 from sliding within the tubular members 30, 40 prior to tightening (the connector assembly 50 is tightly secured after adjustment, enough to prevent any sliding). The first inner support 35 and the second inner support 45 are spaced apart a length equal to the length of the connector assembly 50 when the first end 31 of the first tubular member 30 is positioned against the second end 41 of the second tubular member 40.

D. Connector Assembly

The connector assembly 50 includes a first end 51 that fits within the first tubular member 30 and an opposite second end 52 that fits within the second tubular member 40 to connect the first tubular member 30 to the second tubular member 40. It is appreciated that the first end 51 and the second end 52 may be comprised of different perimeters to fit within different sized tubular members 30, 40 and thus connect different sized tubular members 30, 40. However, in the preferred embodiment, the first end 51 and the second end 52 are comprised of similar diameters.

The connector assembly 50 connects the tubular members 30, 40 by laterally adjusting to increase an outside perimeter of the connector assembly 50 and thus tighten against an inner surface of the first tubular member 30 and the second tubular member 40. The connector assembly 50 includes a first connector 60 connected to a second connector 80. A first longitudinal slot 55 and a second longitudinal slot 56 extend between the first connector 60 and the second connector 80 on opposite diagonal corners. The first longitudinal slot 55 and the second longitudinal slot 56 increase in width as the connector assembly 50 laterally adjusts (where the first connector 60 and the second connector 80 move away from each other) this providing for the increase in the perimeter of the connector assembly 50.

The first connector 60 and the second connector 80 are preferably comprised of identical structures and mirror each other about a longitudinal axis of the connector assembly 50. The first connector 60 includes a first side 61 and a second side 62 perpendicularly extending from the first side 61 to form an L-shaped structure. The second connector 80 includes a third side 81 and a fourth side 82 perpendicularly extending from the third side 81 to form an L-shaped structure. When the first connector 60 connects to the second connector 80, the first connector 60 and the second connector 80 form a substantially square-shaped structure similar to the cross-sectional shape of the tubular members 30, 40 to fit within.

The first side 61 and the second side 62 of the first connector 60 define a first longitudinal corner 63 at a first intersecting line. The third side 81 and the fourth side 82 of the second connector 80 define a second longitudinal corner 83 at a second intersecting line. The first longitudinal corner 63 and the second longitudinal corner 83 are thus diagonally opposite one another when the first connector 60 is connected to the second connector 80.

A first receiver opening 64 extends through the first longitudinal corner 63 near the first end 51 of the connector assembly 50 to receive a first fastener 67 and a second receiver opening 84 extends through the second longitudinal corner 83 near the second end 52 of the connector assembly 50 to receive a second fastener 87. The first receiver opening 64 aligns with the first openings 33 of the first tubular member 30 and the second receiver opening 84 aligns with the second openings 43 of the second tubular member 40.

A first securing member 65, generally comprised of a nut, is aligned with the first receiver opening 64 and positioned inwardly from the first receiver opening 64 and a second securing member 85, generally comprised of a nut, is aligned with the second receiver opening 84 and positioned inwardly from the second receiver opening 84. The fasteners 67, 87 are able to threadably connect to a respective connector 60, 80 via the securing members 65, 85.

The first connector 60 includes a first interlocking element 70 and a second interlocking element 73 and the second connector 80 includes a third interlocking element 90 and a fourth interlocking element 93. The first interlocking element 70 of the first connector 60 interconnects with the fourth interlocking element 93 of the second connector 80 to hold the first connector 60 to the second connector 80 at the first end 51 of the connector assembly 50 and thus likewise for the third interlocking element 90 of the second connector 80 and the second interlocking element 73 of the first connector 60 interlock at the second end 52 of the connector assembly 50.

The first interlocking element 70 and the third interlocking element 90 are comprised of identical structures. The first interlocking element 70 and the third interlocking element 90 are comprised of a planar configuration, similar to a plate, and each include an opening 71, 91 extending therethrough. The openings 71, 91 align with the respective receiver opening 64, 84. The first interlocking element 70 extends across the first connector 60 inwardly of the first securing member 65 and is attached to the first side 61 and the second side 62. The third interlocking element 90 extends across the second connector 80 inwardly of the second securing member 85 and is attached to the third side 81 and the fourth side 82.

The second interlocking element 73 extends inwardly from the end of the first connector 60 opposite the second receiver opening 84 to connect with the third interlocking element 90 of the second connector 80. Likewise, the fourth interlocking element 93 extends inwardly from the end of the second connector 80 opposite the first receiver opening 64 to connect with the first interlocking element 70 of the first connector 60.

The second interlocking element 73 and the fourth interlocking element 93 are comprised of identical structures. The second interlocking element 73 and the fourth interlocking element 93 each include a support portion 74, 94 securing the interlocking element 73, 93 to the respective connector 60, 80, a lateral portion 75, 95 extending laterally from the support portion 74, 94 towards the other connector 60, 80 and a longitudinal portion 76, 96 extending longitudinally from the lateral portion 75, 95 towards a longitudinal center of the connector assembly 50.

An opening 77 extends through the longitudinal portion 76 of the second interlocking element 73 to align with the opening 91 of the third interlocking element 90 of the second connector 80 and the second receiver opening 84, and an opening 97 extends through the longitudinal portion 96 of the fourth interlocking element 93 to align with the opening 71 of the first interlocking element 70 of the first connector 60 and the first receiver opening 64, and. The longitudinal portion 76, 96 is positioned on an outside of the first interlocking element 70 and second interlocking element 90 respectively to hold the first connector 60 to the second connector 80.

The amount of space between the longitudinal portion 76, 96 and the connected first interlocking element 70 or third interlocking element 90 defines the amount that the connector assembly 50 can laterally adjust. It is appreciated that each of the second interlocking element 73 and the fourth interlocking element 93 are comprised of a plate like structure.

E. Operation of Preferred Embodiment

Figure 3:
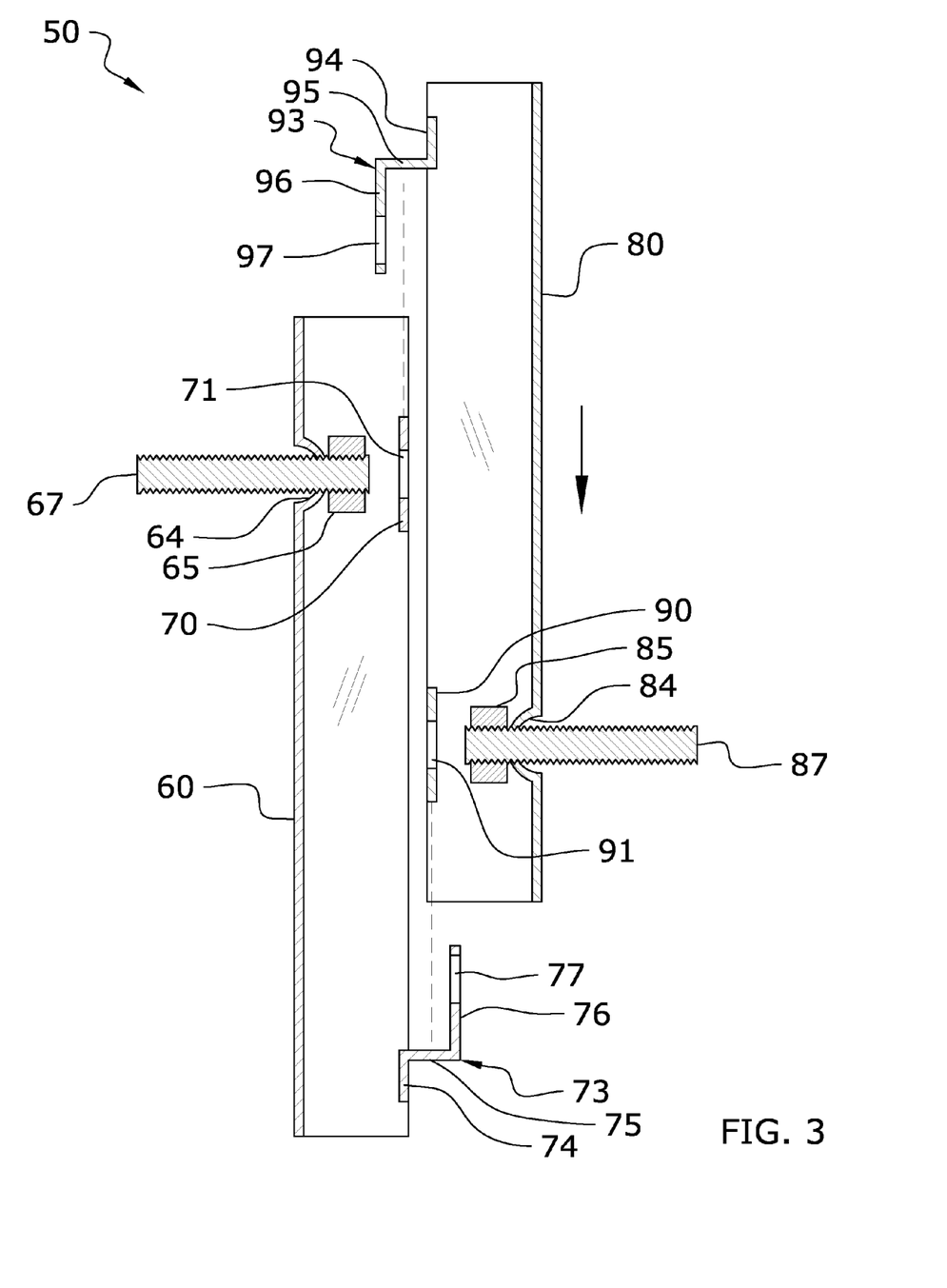
FIG. 3 is a side cross-sectional view of the first connector and the second connector aligned for attachment.
Figure 4:
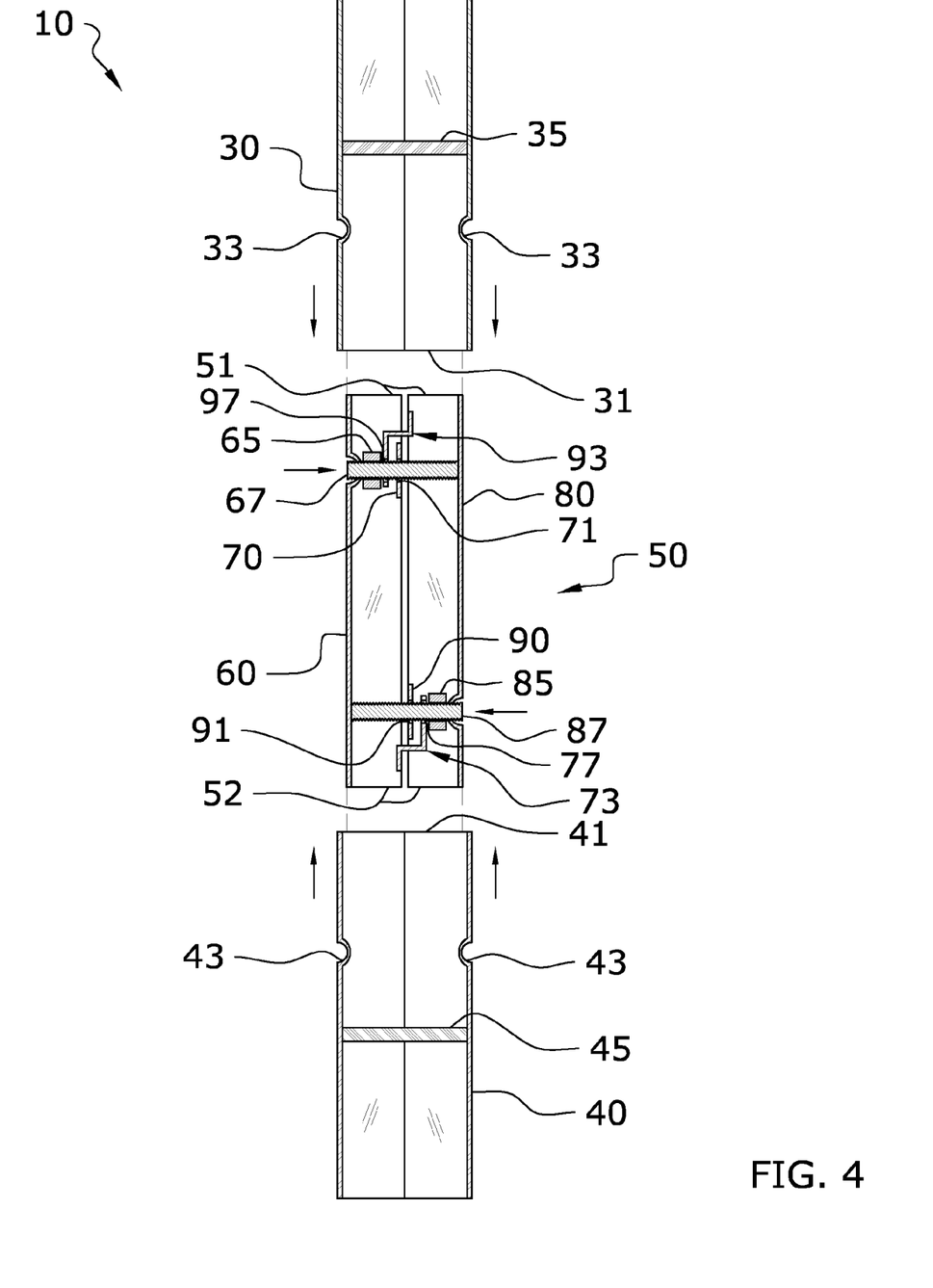
FIG. 4 is a side cross-sectional view of the first connector and the second connector attached to form the connector assembly and aligned with the tubular members.
Figure 5:
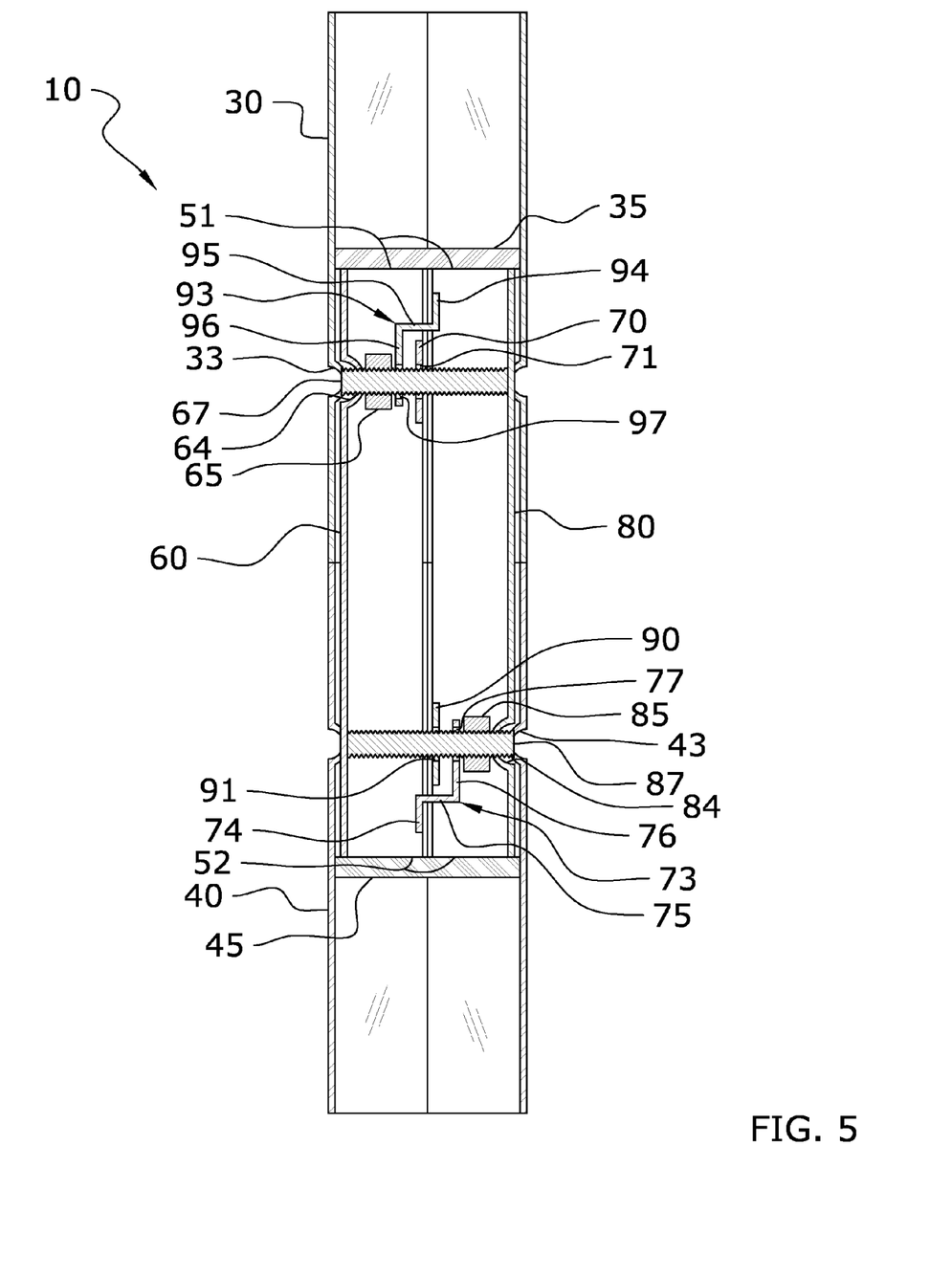
FIG. 5 is a side cross-sectional view of the connector assembly loosely positioned within the tubular members.
Figure 6:
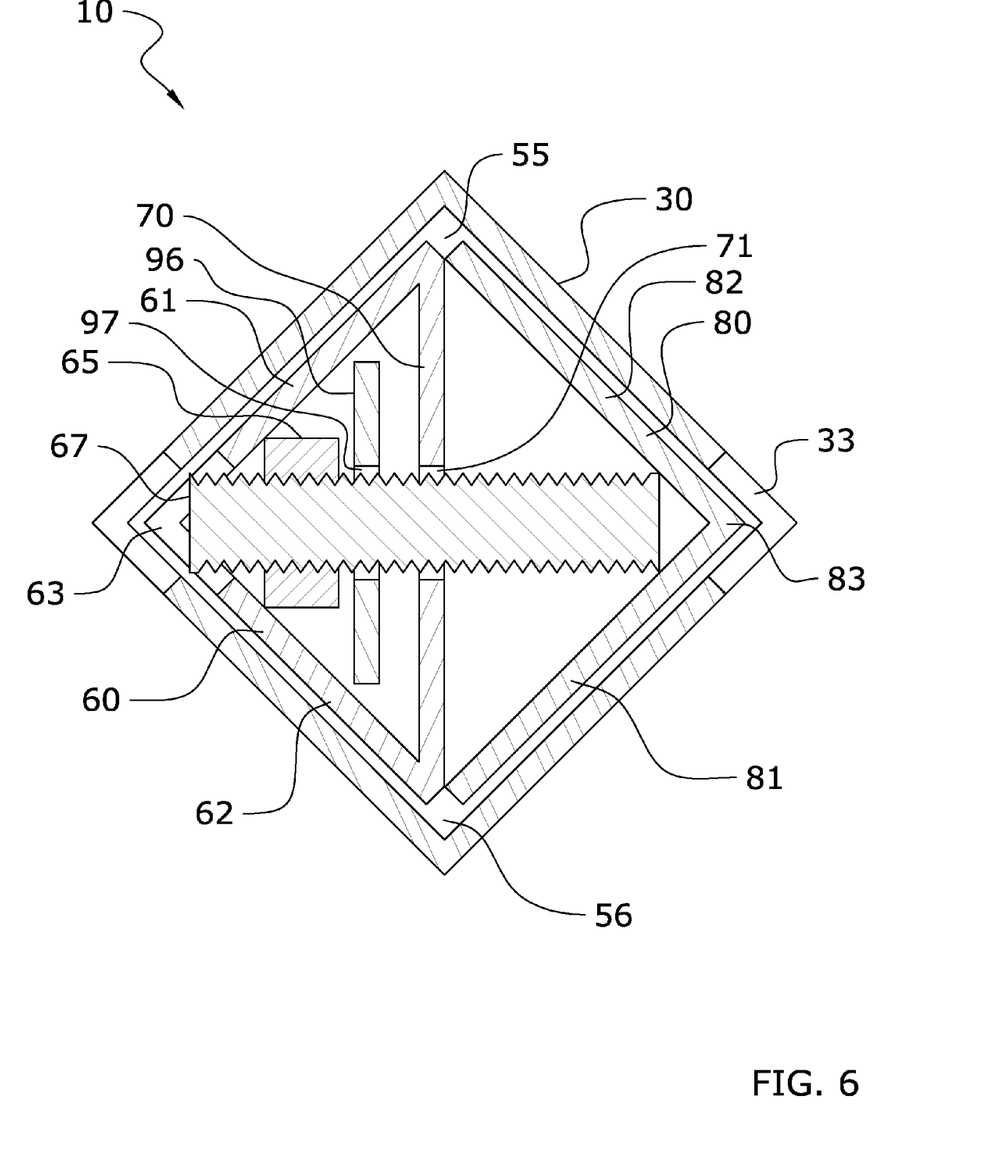
FIG. 6 is a top sectional view of the connector assembly loosely positioned within the tubular members.
Figure 7:
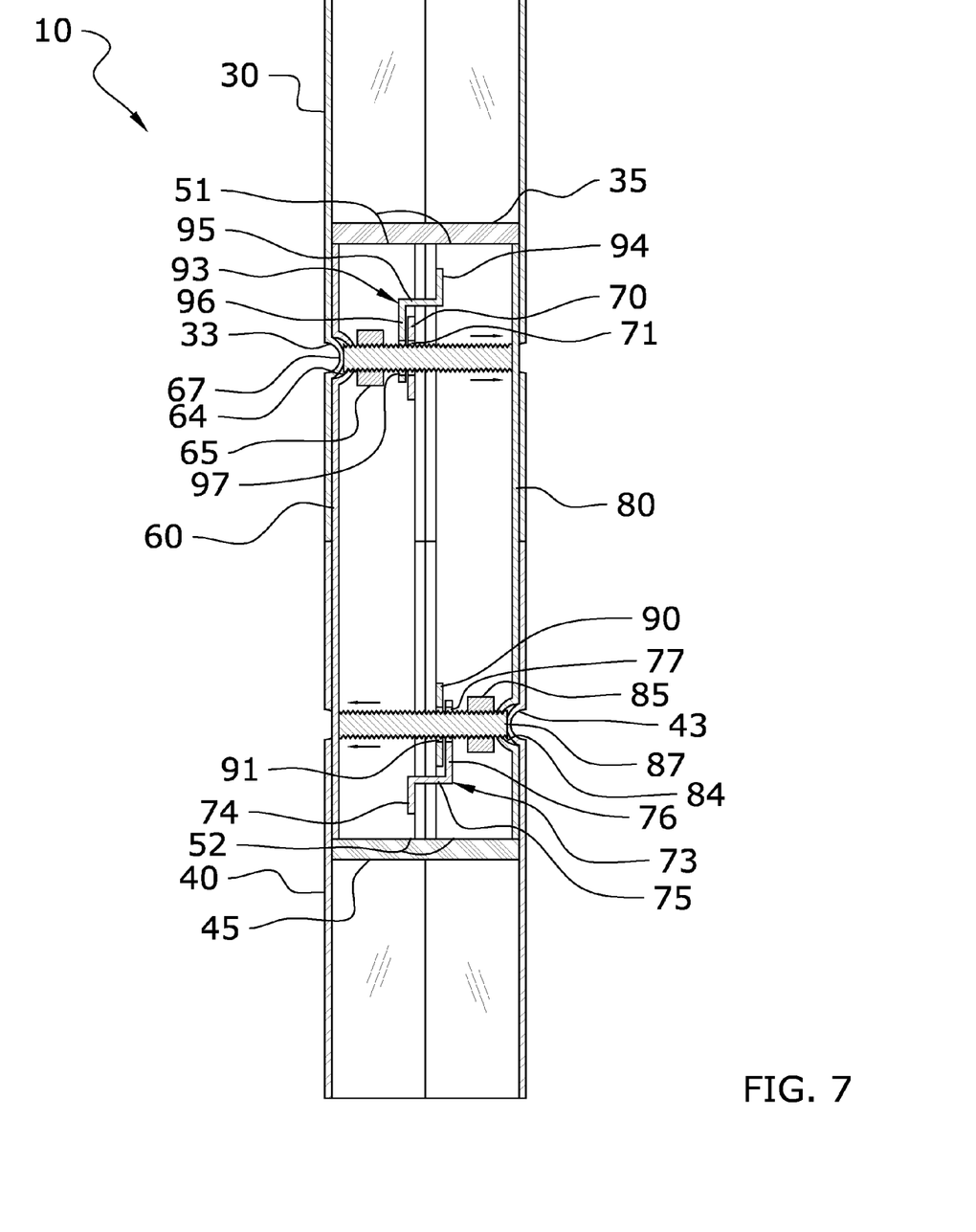
FIG. 7 is a side cross-sectional view of the connector assembly laterally expanding within the tubular members to hold the tubular members together via a frictional force.
Figure 8:
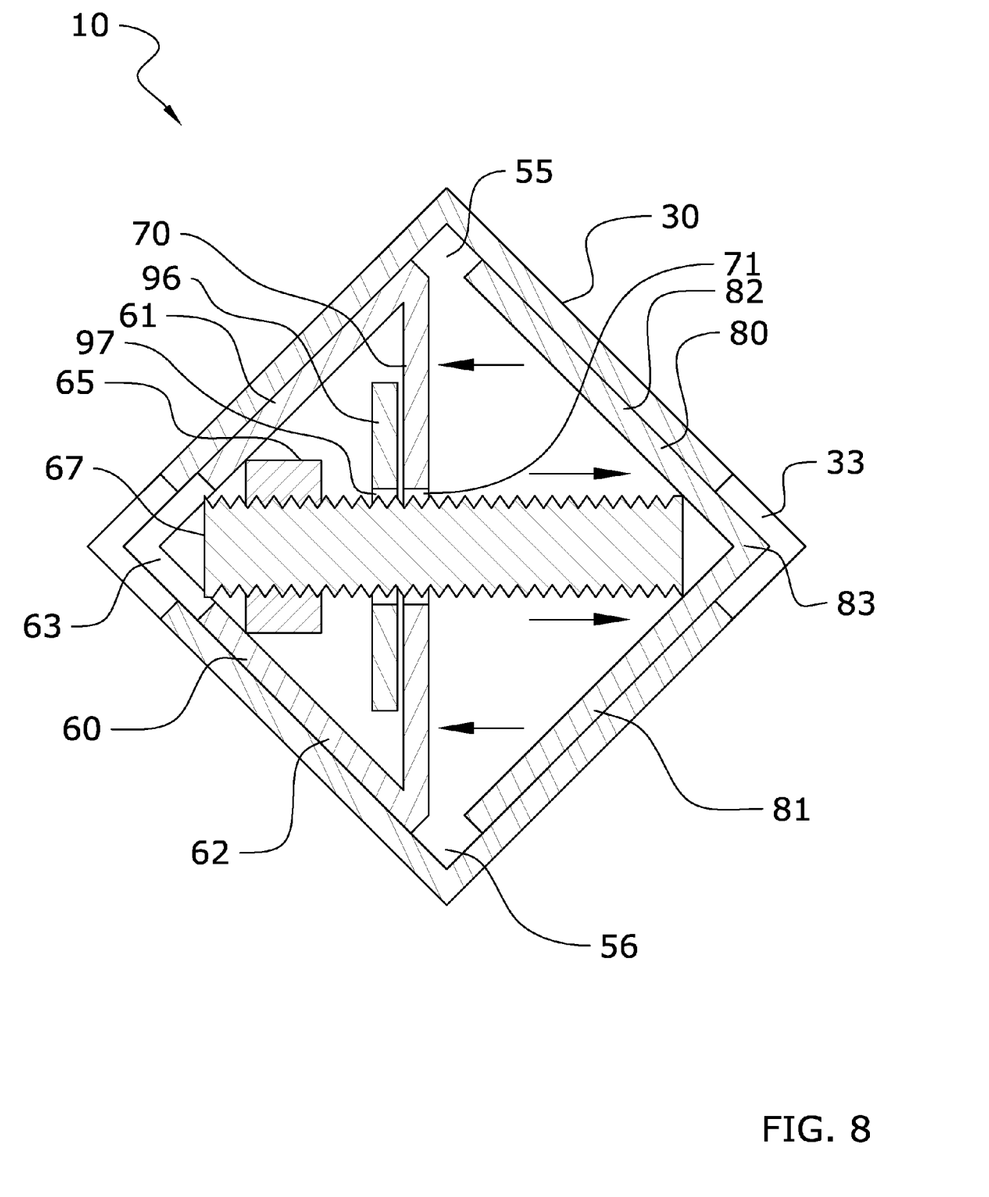
FIG. 8 is a top sectional view of the connector assembly laterally expanding within the tubular members to hold the tubular members together via a frictional force.

In use, to assemble the connector assembly 50, the second connector 80 is positioned forward of the first connector 60 as illustrated in FIG. 3. The second connector 80 and the first connector 60 are then pivoted together to form a square cross-sectional shape. Both the fasteners 67, 87 are also loosened so that the fasteners 67, 87 do not extend inwardly from a respective securing member 65, 85.

The second connector 80 is then moved rearwardly so that the fourth interlocking element 93 of the second connector 80 slides along the first interlocking element 70 of the first connector 60 between the first interlocking element 70 and the first securing member 65. Simultaneously, the third interlocking element 90 of the second connector 80 is slid along the second interlocking element 73 of the first connector 60 so that the second interlocking element 73 of the first connector 60 is likewise positioned between the third interlocking element 90 of the second connector 80 and the second securing member 85. The first connector 60 is now being held loosely to the second connector 80 and the openings 71, 77, 91, 97 along with a respective receiver opening 64, 84 align.

The first fastener 67 and the second fastener 87 are now threadably tightened so travel inwardly past a respective securing member 65, 85. In the preferred embodiment, a tool, such as an Allen wrench, is used to threadably tighten the fasteners 67, 87, however other tools or manners of tightening may be appreciated. The head of each of the fasteners 67, 87 is also preferably substantially smaller than a respective receiver opening 64, 84 so that the head may be positioned within the receiver opening 64, 84 inwardly of an outside surface of a respective connector 60, 80 so that the connector assembly 50 may slide smoothly within the tubular members 30, 40.

The fasteners 67, 87 are threaded within the connector assembly 50 to a point where the head of the fasteners 67, 87 is inwardly positioned with respect to the outside surface of the connector assembly 50 yet the opposing end of each of the fasteners 67, 87 (as the head) just engages the opposing longitudinal corner 63 83 of the connector assembly 50 as the receiver opening 64, 84 (that the fastener 67, 87 is extending through) so that the connector assembly 50 has a perimeter small enough to fit within the tubular members 30, 40.

The first end 51 of the connector assembly 50 is now inserted within the first end 31 of the first tubular member 30 and slid inwards along a longitudinal axis until the first end 51 of the connector assembly 50 engages the first inner support 35. Likewise, the second end 52 of the connector assembly 50 is now inserted within the second end 41 of the second tubular member 40 and slid inwards along a longitudinal axis until the second end 52 of the connector assembly 50 engages the second inner support 45. The first end 31 of the first tubular member 30 and the second end 41 of the second tubular member 40 are now positioned next to each other. It is appreciated that the connector assembly 50 need not extend within the tubular members 30, 40 all the way to the inner support if desiring to increase the distance between the first tubular member 30 and the second tubular member 40.

The tool is now inserted within the first opening 33 of the first tubular member 30 to engage the first fastener 67 and threadably tighten the first fastener 67. As the first fastener 67 threadably travels in a tightening manner, the distal end of the first fastener 67 engages the opposing longitudinal corner 83 and pushes on the longitudinal corner 83 thus effectively moving the second connector 80 away from the first connector 60 and increasing the width of the first longitudinal slot 55 and the second longitudinal slot 56 near the first end 51. Thus, the perimeter of the connector assembly 50 near the first end 51 increases and frictionally engages the inside surface of the first tubular member 30 in a tight manner to prevent the first tubular member 30 from moving longitudinally with respect to the connector assembly 50.

The tool is now inserted within the second opening 43 of the second tubular member 40 to engage the second fastener 87 and threadably tighten the second fastener 87. As the second fastener 87 threadably travels in a tightening manner, the distal end of the second fastener 87 engages the opposing longitudinal corner 63 and pushes on the longitudinal corner 63 thus effectively moving the first connector 60 away from the second connector 80 and increasing the width of the first longitudinal slot 55 and the second longitudinal slot 56 near the second end 52. Thus, the perimeter of the connector assembly 50 near the second end 52 increases and frictionally engages the inside surface of the second tubular member 40 in a tight manner to prevent the second tubular member 40 from moving longitudinally with respect to the connector assembly 50. It is appreciated that the alignment of the corners 63, 83 and slots 55, 56 of the connector assembly 50 with the tubular members 30, 40 prevents the tubular members 30, 40 from rotating with respect to the connector assembly 50.

It is appreciated that the user may have to go back and forth between tightening the first fastener 67 and the second fastener 87 to prevent the connector assembly 50 from binding while increasing the perimeter of a given end 51, 52. The first tubular member 30 is now securely connected to the second tubular member 40 via the connector assembly 50. If it is desired to dismantle the first tubular member 30 from the second tubular member 40, the above process is simply reversed by decreasing a diameter of the connector assembly 50 so that the first tubular member 30 and the second tubular member 40 may be slid away from the connector assembly 50.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A split tube connector, comprising:
   a first tubular member including a first opening;
   a second tubular member including a second opening, wherein said second tubular member is separate from said first tubular member;
   a connector assembly including a first connector and a second connector, wherein said first connector is connected to said second connector;
   wherein a first end of said connector assembly is removably positioned within said first tubular member and wherein a second end of said connector assembly is removably positioned with said second tubular member;
   wherein said first connector includes a first receiver opening extending therethrough, wherein said first receiver opening is aligned with said first opening of said first tubular member;
   a first fastener extending through said first receiver opening, wherein said first fastener threadably connects to said first connector;
   wherein said first fastener engages said second connector;
   wherein said second connector includes a second receiver opening extending therethrough, wherein said second receiver opening is aligned with said second opening of said second tubular member; and
   a second fastener extending through said second receiver opening, wherein said second fastener threadably connects to said second connector;
   wherein said first connector includes a first connecting element and a second connecting element and wherein said second connector includes a third connecting element and a fourth connecting element;
   wherein said first connecting element interlocks with said fourth connecting element and wherein said second connecting element interlocks with said third connecting element;
   wherein said first fastener extends through aligned openings of said first connecting element and said fourth connecting element;
   wherein said second fastener extends through aligned openings of said second connecting element and said third connecting element;
   wherein said second connector engages said first connector;
   wherein said first fastener pushes on said second connector and wherein said second fastener pushes on said first connector to increase an outer perimeter of said connector assembly to engage a first inner surface of said first tubular member and a second inner surface of said second tubular member and frictionally secure said first tubular member to said second tubular member via said connector assembly.

2. The split tube connector of claim 1, wherein said first connecting element is comprised of an identical structure to said third connecting element and wherein said second connecting element is comprised of an identical structure to said fourth connecting element.

3. The split tube connector of claim 1, including a cabinet lifter for lifting and lowering a load, wherein said cabinet lifter comprises a base, a vertical mast extending upwardly from said base, and a lifting unit vertically movable along said vertical mast, wherein said vertical mast is comprised of said first tubular member and said second tubular member.

4. The split tube connector of claim 1, wherein said first tubular member includes a first inner support extending across an interior of said first tubular member to restrict passage of said first end along a longitudinal length of said first tubular member and wherein said second tubular member includes a second inner support extending across an interior of said second tubular member to restrict passage of said second end along a longitudinal length of said second tubular member.

5. A split tube connector, comprising:
   a first tubular member including a first opening and a first inner support;
   a second tubular member including a second opening and a second inner support, wherein said second tubular member is separate from said first tubular member;
   a connector assembly including a first connector and a second connector, wherein said first connector is connected to said second connector;
   wherein a first end of said connector assembly is removably positioned within said first tubular member to engage said first inner support and wherein a second end of said connector assembly is removably positioned with said second tubular member to engage said second inner support;
   wherein said first connector includes a first receiver opening extending therethrough, wherein said first receiver opening is aligned with said first opening of said first tubular member;
   a first fastener extending through said first receiver opening, wherein said first fastener threadably connects to said first connector;
   wherein said first fastener engages said second connector;
   wherein said second connector includes a second receiver opening extending therethrough, wherein said second receiver opening is aligned with said second opening of said second tubular member; and a second fastener extending through said second receiver opening, wherein said second fastener threadably connects to said second connector;

wherein said second connector engages said first connector;

wherein said first fastener pushes on said second connector and wherein said second fastener pushes on said first connector to increase an outer perimeter of said connector assembly to engage a first inner surface of said first tubular member and a second inner surface of said second tubular member to frictionally connect said first tubular member to said second tubular member via said connector assembly;

wherein said first connector includes a first connecting element and a second connecting element and wherein said second connector includes a third connecting element and a fourth connecting element;

wherein said first connecting element interlocks with said fourth connecting element and wherein said second connecting element interlocks with said third connecting element;

wherein said first fastener extends through aligned openings of said first connecting element and said fourth connecting element;

wherein said second fastener extends through aligned openings of said second connecting element and said third connecting elements;

wherein said first connecting element and said third connecting element are comprised of a planar structure;

wherein said second connecting element and said fourth connecting element each include a lateral portion extending inwardly and a longitudinal portion extending therefrom;

wherein said first connector and said second connector mirror each other;

wherein said first connector and said second connector are each comprised of an L-shaped structure;

wherein said connector assembly includes a first longitudinal slot and a second longitudinal slot defining opposing corners of said connector assembly;

wherein a first width of said first longitudinal slot and a second width of said second longitudinal slot adjust when laterally adjusting said first connector and said second connector.

6. A connector assembly for split tubular members, comprising:

a first connector having a first receiver opening;

a second connector having a second receiver opening, wherein said second connector separably connects to said first connector wherein said first connector includes a pair of first connecting elements and wherein said second connector includes a pair of second connecting elements, wherein said pair of first connecting elements interlock with said pair of second connecting elements to connect said first connector to said second connector;

wherein said pair of first connecting elements each include a first opening extending therethrough and wherein said pair of second connecting elements each include a second opening extending therethrough such that said first opening and said second opening of each interlocked said first and second connecting element align to receive a respective first or second fastener therethrough;

a first threaded assembly positioned between said first and second connectors and comprising said first fastener and a first nut, wherein said first nut is threadably movable along said first fastener;

wherein said first fastener has a first end and a second end, wherein said first end of said first fastener is aligned with said first receiver opening to permit external access to said first end such that a rotation of said first fastener causes said first nut to engage first interior walls of said first connector and causes said second end of said first fastener to move from a first non-engaged position to a first engaged position and push upon second interior walls of said second connector; and a second threaded assembly positioned between said first and second connectors and comprising said second fastener and a second nut, wherein said second nut is threadably movable along said second fastener;

wherein said second fastener has a third end and a fourth end, wherein said third end of said second fastener is aligned with said second receiver opening to permit external access to said third end such that a rotation of said second fastener causes said second nut to engage said second interior walls of said second connector and causes said fourth end of said second fastener to move from a second non-engaged position to a second engaged position and push upon said first interior walls of said first connector;

wherein lateral adjustment of said first and second connectors via rotation of said first and second threaded assemblies causes a first exterior portion of said first connector and a second exterior portion of said second connector to each frictionally engage interior walls of said split tubular members and secure said split tubular members together.

7. The connector assembly for split tubular members of claim 6, wherein said first connector has a first side and a second side, wherein said first side and said second side comprise an L-shaped structure and wherein said second connector has a third side and a fourth side, wherein said third side and said fourth side comprise an L-shaped structure, wherein said first connector and said second connector are separably connected to form a square cross-sectional structure.

8. The connector assembly for split tubular members of claim 7, wherein said first receiver opening extends through said first side and wherein said second receiver opening extends through said third side, wherein said second end of said first fastener engages said third side and wherein said fourth end of said second fastener engages said first side.

9. The connector assembly for split tubular members of claim 6, wherein an interlocked said first and second connecting element are spaced-apart a first distance prior to engagement of said second end of said first fastener with said second connector and said fourth end of said second fastener with said first connector and are spaced-apart a second distance after engagement of said second end of said first fastener with said second connector and said fourth end of said second fastener with said first connector, wherein said second distance is less than said first distance.

10. The connector assembly for split tubular members of claim 6, wherein said first opening and said second opening are non-threaded such as to permit free passage of said first and second fastener therethrough.

11. The connector assembly for split tubular members of claim 6, wherein said first connector has a first side and a second side, wherein said first side and said second side comprise an L-shaped structure and wherein said second connector has a third side and a fourth side, wherein said third side and said fourth side comprise an L-shaped structure, wherein said first connector includes a first connecting element and a second connecting element, and wherein said second connector includes a third connecting element and a fourth connecting element, wherein said first connecting element interlocks with said third connecting element and wherein said second connecting element interlocks with said fourth connecting element to connect said first connector to said second connector.

12. The connector assembly for split tubular members of claim 11, wherein said first connecting element extends across said first connector from said first side to said second side to form a triangular cross-sectional shape and wherein said third connecting element extends across said second connector from said third side to said fourth side to form a triangular cross-sectional shape.

13. The connector assembly for split tubular members of claim 12, wherein both said second connecting element and said fourth connecting element include a lateral portion and a longitudinal portion, wherein said lateral portion and said longitudinal portion are substantially perpendicular and wherein said longitudinal portion aligns with a respective said first or third connecting element.

14. The connector assembly for split tubular members of claim 12, wherein interlocked said first and third connecting elements and said second and fourth connecting elements are spaced-apart a first distance prior to engagement of said second end of said first fastener with said second connector and said fourth end of said second fastener with said first connector and are spaced-apart a second distance after engagement of said second end of said first fastener with said second connector and said fourth end of said second fastener with said first connector, wherein said second distance is less than said first distance.

15. The connector assembly for split tubular members of claim 14, wherein said first connecting element includes a first opening, wherein said second connecting element includes a second opening, wherein said third connecting element includes a third opening, and wherein said fourth connecting element includes a fourth opening, wherein said first opening and said third opening align to receive said first fastener therethrough and wherein said second opening and said fourth opening align to receive said second fastener therethrough.

16. The connector assembly for split tubular members of claim 15, wherein said first opening, said second opening, said third opening, and said fourth opening are each non-threaded such as to permit free passage of said first and second fastener therethrough.

* * * * *